April 2, 1968     I. GOLDMAN     3,376,004
SNAP CLAMP
Filed June 16, 1966
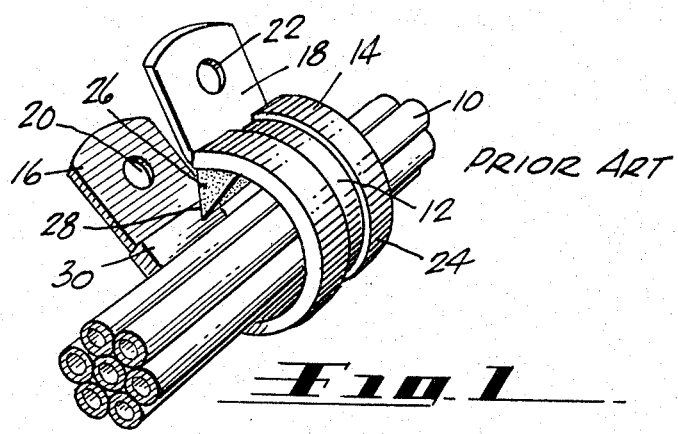
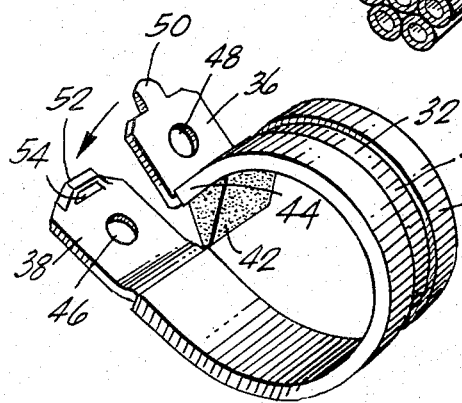 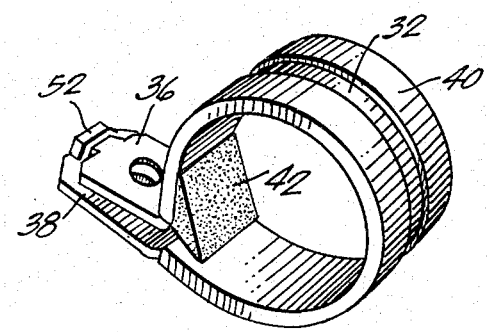
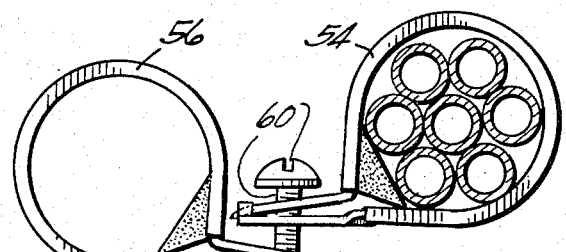
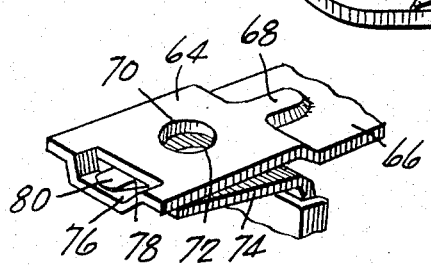
INVENTOR.
ISRAEL GOLDMAN
BY *Robert O. Richardson*
- ATTORNEY -

United States Patent Office 3,376,004
Patented Apr. 2, 1968

3,376,004
SNAP CLAMP
Israel Goldman, Los Angeles, Calif., assignor, by mesne assignments, to McDonnell Douglas Corporation, Santa Monica, Calif., a corporation of Maryland
Filed June 16, 1966, Ser. No. 558,011
7 Claims. (Cl. 248—74)

ABSTRACT OF THE DISCLOSURE

A snap clamp especially adapted for use in the retention and support of tubing, rods, or a plurality of electrical wires. An integral locking device consisting of a bridge struck from one end of the clamp and an engageable tongue extending from the other end, when engaged, retain these items within the clamps independently of its mounting to a support.

---

There are many varieties of clamps in the form of a loop encompassing a group of wires or other hardware and having end portions through which a bolt may be inserted to attach the support item to a support member. Some clamps have a resilient cushioning lining provided in the loop to protect the wires or other hardware from direct contact and abrasion by the loop portion of the clamp. There may be included a filler block at one end of the loop to prevent one or more of the wires from being forced between the ends of the clamp or lining when the clamp is tightened. Other clamps have additional parts for retaining the adjacent ends together before the clamp is mounted to a support. These retaining means have various disadvantages in operation, reliability, cost, weight or size, thus creating a need for a novel integral retaining means per se in addition to its other functions.

Summary of the invention

In accordance with the present invention, a clamp is provided wherein the ends thereof are held together after the loop has been placed around the bundle of wires or other hardware and before the clamp has been mounted to a support. Additionally, means are provided to prevent one or more wires from becoming sandwiched between the ends of the clamp. The clamp may then be placed on a support. This enables the stacking of several such clamps on the same support, a task which heretofore has been awkward, delicate, and time consuming.

The clamp comprising the present invention is an improvement over the supporting clip (clamp) of H. P. Thomas, Patent Number 2,692,746. The Thomas supporting clamp utilizes a filler block and resilient lining for cushioning and positioning a multiplicity of wires to be mounted on a support. In order to firmly retain the wires, the end portions are held together by means of a bolt which is also used to fasten the clamp to a support. Applicant's improvement resides in the fabrication of an integral locking device for the retention of the two ends of a clamp in abutting relationship before mounting the clamp to the support. This may be done in combination with the filler block and resilient lining or with clamps not having this feature. During the installation and mounting to the support, when the filler block and resilient lining are used, the wires will not become sandwiched between the ends of the loop. In addition, with the locking device, a plurality of such clamps may be anchored to one support.

It is therefore an object of this invention to provide for an improved locking clamp.

Another object is the provision of a locking clamp for the retention of wires and other hardware to a support.

Another object is the provision of a clamp which reduces vibration between a support and wires or other hardware mounted thereon.

Another object is the provision of a locking mechanism for a clamp which retains the wires in a secured position before the clamp is mounted to a support.

These and other objects will become more apparent as a description of this invention proceeds, now having reference to the drawings, wherein:

Brief description of the drawing

FIGURE 1 is a perspective view showing a prior art supporting clamp;

FIG. 2 is a perspective view of the clamp of the present invention in open position;

FIG. 3 is a perspective view of the clamp in fastened position;

FIG. 4 is an end view showing a plurality of clamps fastened to a support; and

FIG. 5 is a perspective view of the locking device shown taken along arrow 5 in FIG. 4.

Description of the present embodiment

Referring now to the prior art device shown in FIG. 1 which is the Thomas supporting clamp to which reference was previously made, there is shown a bundle of wires 10 cradled within the loop 12 of clamp 14. Clamp 14 has a straight lower foot 16 and an upper ear 18, each having corresponding apertures 20 and 22 adapted to be in alignment to receive a bolt when installed. A resilient lining 24 encompasses the loop 12 to hold the wires snugly and to prevent excessive wear on the wire insulation. In a manner best described by the foregoing patent, a filler block 26 at one end of the lining has an apex 28 adapted to contact the opposite end 30 of the resilient lining when the ear and foot are pressed together. This prevents vibration between the bundle of wires or other hardware and the supporting bracket, and, in the installation, prevents accidental insertion of one of the wires between the ear 18 and foot 16.

Reference is now made to FIG. 2 wherein there is shown a clamp 32 having a loop 34 terminating in an ear 36 and foot 38. A resilient removable lining 40 extends around the loop 34 to protect the bundle of wires to be retained thereby. Filler block 42 is inwardly directed from lining end 44 in the same manner as that shown in FIG. 1. Openings 46 and 48 are for the purpose of receiving a bolt in the mounting of the clip 32 to a suitable support.

An outwardly directed double tapered tongue 50 extends from ear 36. An inwardly depressed bridge 52 defines an opening slot 54 on foot 38 which is adapted to receive tongue 50, as shown in FIG. 3. The upper tapered surface of tongue 50 presents a plane of contact with bridge 52 normal to the direction of outward force of ear 18 due to the spring effect of loop 34. Such an engagement of the slot and tongue retains the clamp in position to snugly retain the bundle of wires or other hardware to be held thereby until the clamp can be mounted on a suitable support. This upper surface taper of tongue 50 permits latching without having the bridge 52 protrude above the plane of the upper surface of ear 36. This permits the stacking of clamps. As shown in FIG. 4, a plurality of clamps, wires or other hardware held thereby, are mounted to support 58 by the bolt 60 that has been inerted through the openings in the foot and ears of the clamps. The clamps are additionally squeezed together upon the tightening of nut 62 to prevent vibration.

FIG. 5 is a view looking along the direction of arrow 5 in FIG. 4. Here there is shown a foot 64 recessed relative to the end 66 of the loop of the clip and a reinforcing bead 68 provides rigidity therebetween. Opening 70 is in alignment with opening 72 of ear 74. Bridge 76 forming slot 78, which receives tongue 80, has been made by striking the appropriate configuration from the foot 64.

Having thus described a preferred embodiment of the invention, it is to be understood that other modifications and variations will readily occur to those skilled in the art and it is to be understood that these deviations from the embodiment just described are intended to be part of this invention as defined by the appended claims.

What is claimed is:

1. A snap clamp comprising:
  a loop portion terminating in an ear end and a foot end, said ends forming an integral locking device for the retention thereof in abutting relationship before mounting said clamp to a support, said foot end having an inwardly depressed bridge defining an opening slot on said foot, said ear end having a tongue at the end thereof adapted to snap into said slot and engage said bridge, thereby holding said ends in close proximity until said clamp can be mounted.

2. A snap clamp as in claim 1 wherein openings are provided in said foot and in said ear to receive a fastening bolt therein.

3. A snap clamp as in claim 1 wherein said tongue is outwardly directed from said ear and tapered to provide a plane of contact with said bridge normal to the direction of outward force of said ear due to the resiliency of said loop.

4. A snap clamp as in claim 1 wherein said tongue is tongue is tapered to permit locking without extending said bridge above the upper surface of said ear.

5. A snap clamp as in claim 1 wherein a resilient lining is placed around said loop to insulate wires mounted within said loop and to retard vibration thereof relative to said loop.

6. A snap clamp as defined in claim 5 wherein one end of said resilient lining has an inwardly directed filler block to prevent wires within said loop from becoming sandwiched between said foot and said ear.

7. A snap clamp as in claim 6 wherein the apex of said filler block contacts the other end of said resilient lining when said tongue is positioned within said slot.

References Cited

UNITED STATES PATENTS

| | | | |
|---|---|---|---|
| 2,338,006 | 12/1943 | Morehouse | 248—74 |
| 2,339,093 | 1/1944 | Metheny | 248—74 |
| 2,655,703 | 10/1953 | Flora | 24—16 |
| 2,692,746 | 10/1954 | Thomas | 248—74 |
| 3,214,808 | 11/1965 | Litwin | 24—16 |

ROY D. FRAZIER, *Primary Examiner.*

JOHN PETO, *Examiner.*

J. F. FOSS, *Assistant Examiner.*